Feb. 24, 1942.  F. B. LOMAX  2,274,148
METHOD OF TREATING LIQUID EGG MATERIAL
Filed April 3, 1939
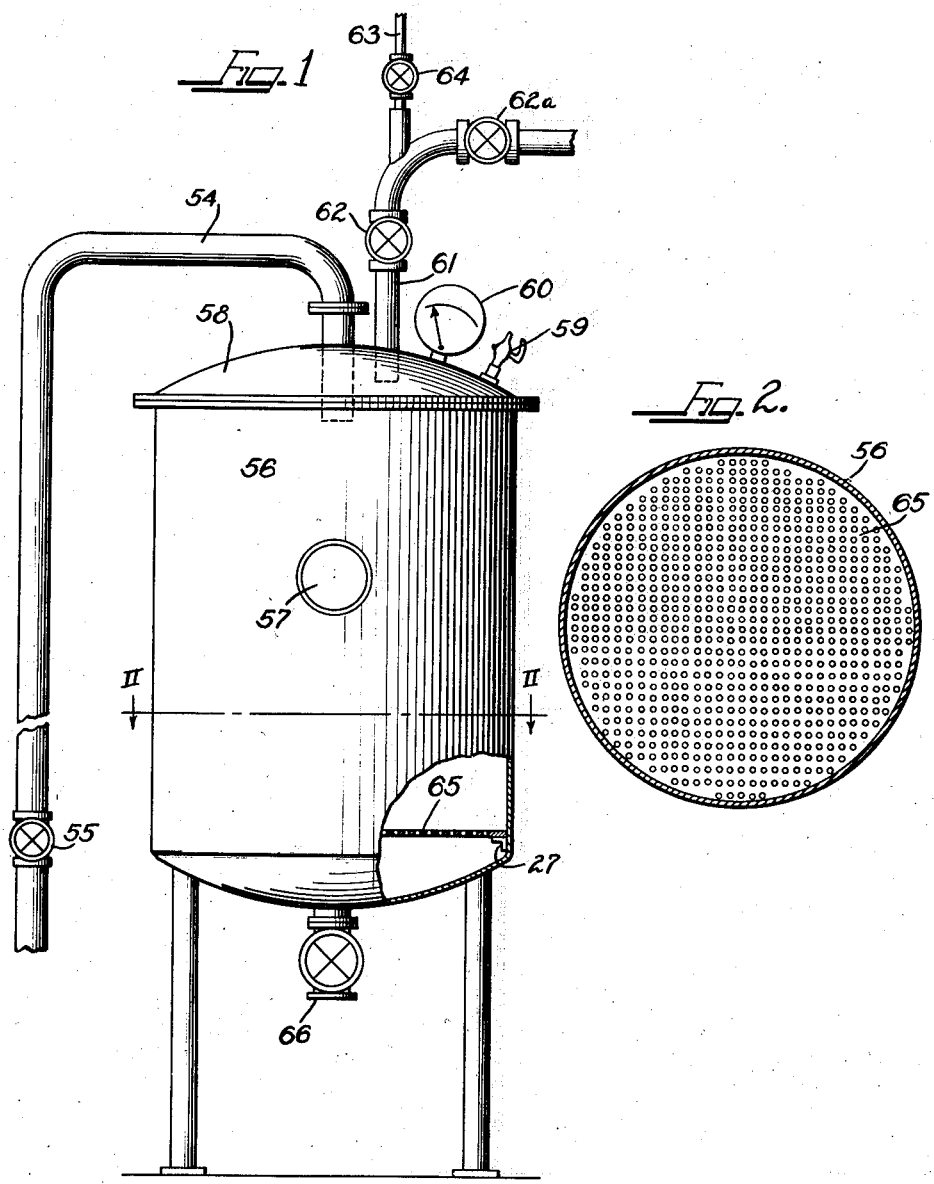
Inventor
FRANK B. LOMAX Patented Feb. 24, 1942

2,274,148

UNITED STATES PATENT OFFICE 2,274,148

METHOD OF TREATING LIQUID EGG MATERIAL

Frank B. Lomax, Chicago, Ill.

Application April 3, 1939, Serial No. 265,860

3 Claims. (Cl. 99—113)

This invention relates to a process of separating egg meats from shell fragments without the use of mechanically applied pressure and which makes use of a gas pressure and preferably a super-atmospheric gas pressure.

More specifically this invention relates to a process for filtering eggs free from shell fragments, dirt, and hard fibrous substances comprising in part the yolk sac of the egg by the aid of gas pressure.

This application is directed to the process practiced by the apparatus illustrated in Figure 4 of my issued Patent No. 2,089,702 granted August 10, 1937, from an application filed January 26, 1935.

Eggs are frozen and stored for use in the baking and confectionery trade. Fresh eggs are packed for this purpose. The meats, whites and yolks, of the eggs are separated from the shells. The egg meats are thoroughly mixed to provide a uniform color. Thereafter they are frozen solid to keep them in good condition.

Such frozen eggs are very extensively used by the trade, being more economical than eggs not so prepared and being more uniform in color and consistency than freshly broken eggs. Canners have aimed to produce frozen eggs free from foreign matter, such as fragments of egg shells which get into the meats as the shells are broken, dirt, and hard fibrous substances comprising in part the yoke sac. They have also endeavored to mix the eggs thoroughly so as to obtain a uniform color free from streaks. The have also strived to handle the eggs so that no air is incorporated into the egg meat mixture to produce foam.

In the present process, the use of a pump in any form to impel the egg meats or to press such meats through a filter may be avoided and gas pressure may be used to transfer the eggs from the mixing tank and to run them through a filter.

The filter may comprise a wire mesh screening or a perforated metal sheet of such porosity that the fragments of shell or other undesirable matter cannot be forced through and will remain in the filter chamber. Part of the egg material, i. e., the chalaza may be disintegrated and pass through the filter. When disintegrated it mixes freely with the egg meats.

The main drawbacks to frozen canned eggs until filtering was adapted therefor was the presence of pieces of shells, dirt, unbroken chalaza, lumps, and the like, which materials affect the sightliness, the cleanliness, and purity of the product. By use of the herein described process for removing these undesirable matters and the breaking up of the chalaza, and the intimate mixture of the broken eggs, the canned eggs are made more desirable and are more easily marketed for there is no settling out of any foreign matter after the eggs are stored and frozen as is common in unfiltered eggs.

It is an object of this invention to provide an improved process for filtering eggs in such a manner that foaming is reduced to a minimum.

A still further object of this invention relates to the provision of a process or method for efficiently separating egg shell fragments and other foreign material involving the use of a gas pressure to force the eggs through a filter means.

Still another object of this invention is to provide a process for forcing egg meats through a filter having a porosity adapted to remove portions of egg shells and other foreign matter without requiring the use of a pump for positively forcing or impelling egg meats through the filter.

In accordance with the general features of this invention, there is provided a method or process of treating liquid egg meats which comprises forcing a body of the egg meats through an opening into a container and then shutting said opening so as to shut the container against leakage of air therein, and applying pressure of gas directly against the surface of the egg meats sealed in the container to force them through a fine wire filter or screen without foaming and whereby foreign matter may be removed from the liquid egg meats and the latter thinned out and rendered homogeneous.

Other objects and features of this invention will more fully appear from the following detailed description taken in connection with the accompanying drawing which illustrates an apparatus for practicing the invention, and wherein:

Figure 1 is a side view of an apparatus for carrying out my process; and

Figure 2 is a cross-sectional view taken on the line II—II of Figure 1 looking downwardly and showing the filter screen.

It is submitted that my novel process or method of treating egg meats may be fully understood from a description of the illustrated apparatus for practicing the process.

As shown on the drawing:

The reference character 56 designates generally the tank for receiving liquid egg material or meats to be treated or processed and which are delivered into the tank through a conduit 54 communicating with any suitable source of supply of liquid egg material and having disposed in it a valve 55.

As disclosed in my apparatus Patent No. 2,089,702, the conduit 54 may communicate with a tank in which a preliminary filtering operation is performed, but it is of course to be understood that the conduit 54 may receive its source of egg material from any other suitable source and the filtering operation performed in the tank 56 may be effected entirely independently of any other previous or subsequent processing operation.

The filtering tank 56 comprises a main body having a sight glass 57 and a cover 58 through which the conduit 54 leading from the source of supply of egg material empties. The tank is also provided with a vacuum breaker 59, a vacuum gauge 60, and a conduit 61 with a suitable vacuum pump (not shown). The conduit 61 has a suitable valve 62 therein.

In addition, there is supplied a conduit 63 having a valve 64, the conduit 63 being connected to the conduit 61. The conduit 63 runs to a carbon dioxide pressure tank or to a pressure pump (not shown). The tank also has in its lower section a filter screen or plate 65 made of perforated sheet metal or of wire mesh. Such wire mesh may be reinforced as desired. The porosity of the filter is such that portions of foreign matter and other solid bodies will not pass therethrough.

Any suitable support may be provided for the filter, such for example, as an angle iron rack 27 mounted on the internal surface of the tank in a horizontal plane near its bottom. Suitable fastening means (not shown) may be employed to lock the filter screen or disc in position. The filter is thus securely mounted against buckling. Moreover, the filter or screen may be divided into segments, the edges of which are overlapping or tightly sealed. A segmental arrangement facilitates removal for cleansing.

Liquid egg material is drawn into the tank through the conduit 54 by means of an evacuat- pump connected to the pipe line 61. It will of course be appreciated that when this step of my process is being performed, the valves shown in pipe line 61 are open, the valve 55 is also open. After the tank has been charged with the predetermined batch of liquid egg material to be processed or filtered, the valve 55 in conduit 54 is closed, and the valve 62a in pipe line 61 is closed.

Then the vacuum in the tank 56 is broken by opening the vacuum breaker 59.

Thereafter gas under pressure, such as air pressure, carbon dioxide or the like is admitted to the upper part of the storage tank 56 through the conduit 63 by opening valve 64; the valve of the vacuum breaker at that time being closed. This super-atmospheric pressure forces the egg material on top of the filter 65 through the screen or filter 65 into the lower part of the tank 56 from which it may be removed by opening the drain valve 66.

It will, of course, be understood that during this filtering step of my process, the interior of the tank above the filter 65 is sealed from the atmosphere by reason of the fact that valves 55 and 62a are closed.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. The method of treating liquid egg material which comprises drawing by air suction liquid egg material into a relatively large capacity closed tank provided with a relatively large area fine mesh screen therein, then disconnecting the air suction from said tank, and introducing gas under super-atmospheric pressure into said tank above the level of said egg material, whereby to force the said egg material through said screen.

2. The method of treating liquid egg material which comprises impelling under air pressure liquid egg material into a relatively large capacity tank provided with a relatively large area fine mesh screen therein, closing the tank against the entry of atmospheric air therein and the leakage of gas therefrom after a given batch of material has been drawn into the tank, and introducing gas under super-atmospheric pressure into said tank above the level of said egg material, whereby to force the said egg material through said screen.

3. The method of treating liquid egg material, which comprises introducing the liquid egg material into a confined area above a filtering barrier therein, and introducing gas under pressure into said area above the level of said egg material, whereby to force the said egg material through said barrier.

FRANK B. LOMAX.